US010523355B2

(12) United States Patent
Muth et al.

(10) Patent No.: US 10,523,355 B2
(45) Date of Patent: *Dec. 31, 2019

(54) SYSTEM AND METHOD FOR APPLYING SYSTEM POLICIES IN AN OPTICAL COMMUNICATION SYSTEM HAVING USER-ALLOCATED BANDWIDTH

(71) Applicant: SubCom, LLC, Eatontown, NJ (US)

(72) Inventors: Edwin Muth, Aberdeen, NJ (US); Bruce Nyman, Freehold, NJ (US); Mark Englund, NSW (AU); Lara Denise Garrett, Red Bank, NJ (US); Ralph Brian Jander, Freehold, NJ (US)

(73) Assignee: Subcom, LLC, Eatontown, NJ (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/399,152

(22) Filed: Jan. 5, 2017

(65) Prior Publication Data
US 2017/0111138 A1 Apr. 20, 2017

Related U.S. Application Data

(63) Continuation of application No. 14/184,199, filed on Feb. 19, 2014, now Pat. No. 9,559,801.
(Continued)

(51) Int. Cl.
*H04J 14/02* (2006.01)
*H04B 10/40* (2013.01)
(Continued)

(52) U.S. Cl.
CPC .......... *H04J 14/0221* (2013.01); *H04B 10/40* (2013.01); *H04B 10/506* (2013.01);
(Continued)

(58) Field of Classification Search
CPC .. H04J 14/0213; H04J 14/0221; H04B 10/564
See application file for complete search history.

(56) References Cited

U.S. PATENT DOCUMENTS

| 2002/0181061 A1* | 12/2002 | Uda | H04B 10/294 |
| | | | 398/141 |
| 2009/0022064 A1* | 1/2009 | Oron | H04L 41/0896 |
| | | | 370/253 |

(Continued)

FOREIGN PATENT DOCUMENTS

JP 2002 368691 A 12/2002

OTHER PUBLICATIONS

State Intellectual Property Office of People's Republic China Search Report, Application No. 201480023698.7, dated Jul. 26, 2017, Beijing, China.
(Continued)

*Primary Examiner* — Omer S Mian

(57) ABSTRACT

A system and method that enforces one or more policy rules on user-allocated bandwidth portions of the overall system bandwidth, for example in an optical fiber transmission system. The policy rules may limit, for example, the range of optical wavelengths, the acceptable range on the output-power-spectral density and/or the total per-band optical power within the user-allocated bandwidth that a user may provide on the system. The system may include one or more user control units that receives respective user output signals and applies all policy rules. The resulting optical output(s) of the UCU(s) may be provided an optical transmission path for transmission to a receiving terminal. In the receiving terminal, one or more UCU(s) may apply receiver policy rules, for instance by limiting the range of wavelengths transmitted to a receive subsystem. In addition, the system may be configured to dynamically add and/or remove loading signals to the transmitted signal in response to changes
(Continued)

in loading of the user-allocated portions of the system bandwidth, e.g. through dropping or adding of channels by a user or by equipment failures.

17 Claims, 6 Drawing Sheets

Related U.S. Application Data

(60) Provisional application No. 61/816,684, filed on Apr. 26, 2013.

(51) Int. Cl.
    *H04B 10/50*     (2013.01)
    *H04B 10/564*     (2013.01)
    *H04B 10/80*     (2013.01)

(52) U.S. Cl.
    CPC ........... *H04B 10/564* (2013.01); *H04B 10/80* (2013.01); *H04J 14/0227* (2013.01); *H04J 14/0256* (2013.01)

(56) References Cited

U.S. PATENT DOCUMENTS

| | | |
|---|---|---|
| 2009/0028552 A1 | 1/2009 | Zhang et al. |
| 2009/0185804 A1* | 7/2009 | Kai ..................... H04J 14/0226 398/48 |
| 2012/0051750 A1 | 3/2012 | Yano |
| 2012/0087658 A1 | 4/2012 | Jander |
| 2013/0004163 A1 | 1/2013 | Aoki |
| 2013/0308453 A1* | 11/2013 | Cook ..................... H04L 41/32 370/235 |

OTHER PUBLICATIONS

International Search Report issued in corresponding application PCT/US2014/034302 dated Jul. 18, 2014.

\* cited by examiner

SYSTEM AND METHOD FOR APPLYING SYSTEM POLICIES IN AN OPTICAL COMMUNICATION SYSTEM HAVING USER-ALLOCATED BANDWIDTH

CROSS-REFERENCE TO RELATED APPLICATIONS

This application is a continuation of co-pending U.S. application Ser. No. 14/184,199, filed Feb. 19, 2014, which claims the benefit of the filing date of U.S. Provisional Application Ser. No. 61/816,684 filed Apr. 26, 2013, the entire teachings of which applications are hereby incorporated herein by reference.

TECHNICAL FIELD

The present application relates to optical transmission of information and more particularly, to a system and method for applying system policies in an optical communication system having user-allocated bandwidth.

BACKGROUND

To maximize the transmission capacity of an optical fiber transmission system, a single optical fiber may be used to carry multiple optical signals in what is called a wavelength division multiplexed system (hereinafter a WDM system). The multiple optical signals may be multiplexed to form a multiplexed signal or WDM signal with each of the multiple signals being modulated on separate channels. Each channel may be at an associated wavelength centered on a defined frequency grid, e.g. according to a channel plan established by the International Telecommunications Union (ITU). The range of wavelengths that may be transmitted on the system is known as the system bandwidth. Systems may utilize their system bandwidth to carry a desired number of channels with desired modulation format, channel plan and bit rate.

In a known configuration, an owner of an optical system may possess all necessary transmission equipment and sell a defined amount of capacity on the system to customers. For example, the owner might sell a defined number of channels at a defined bit rate and channel plan on the system. In such an arrangement, the owner of the system would control all aspects of the physical layer, including, for example, the system channel plan, the channel power, modulation format, bit rate, etc.

Recently, however, there has been interest in a system wherein the owner of the system would sell a defined portion of the system bandwidth to each customer. In this configuration, each customer would have partial control over the physical layer including the type and configuration of equipment used to transmit signals in their portion of the system bandwidth. Each customer would also have control over certain transmission characteristics within their portion of the system bandwidth. Different customers, for example, may establish different channel plans, modulation formats, bit rates, etc. within their portions of the system bandwidth. This overall system configuration gives customers control over adding, removing and/or reconfiguring services within their bandwidth and for managing loading in the unoccupied portions of their bandwidth.

A challenge associated with such a system is that physical layer changes made by one customer within their portion of the system bandwidth may affect transmission performance in other portions of the system bandwidth owned by other customers. For example, a customer may provide a contaminated input spectrum with broadband noise outside of their allocated bandwidth that impacts other customers. Also, since customers could drop or add channels at any time, the corresponding change in path average power, peak power and optical signal-to-noise ratio (OSNR) of surviving channels may fundamentally affect the Q-factor performance of other customers. On receiver side, the customers' receiving amplifier gain and OSNR may be affected by presence of other customer's data. In addition to performance issues, security issues may arise if a customer receives signals outside of their allocated bandwidth.

BRIEF DESCRIPTION OF THE DRAWINGS

Reference should be made to the following detailed description which should be read in conjunction with the following figures, wherein like numerals represent like parts.

DETAILED DESCRIPTION

In general, in a system and method consistent with the present disclosure, a different portion of the system bandwidth is allocated to each of a plurality of users and one or more pre-determined system policy rules are enforced upon each user-allocated portion of the system bandwidth by one or more user control units at the system transmitting and/or receiving terminals. The policy rules may, for example, limit the range of wavelengths to the allocated portions of the system bandwidth, set a range for the optical power that a user must maintain while transmitting on the system, and/or limit the power spectral density or the peak power levels during transmission. Other policies may include controlling other measures such as OSNR or performance metrics such as bit error rate (BER). The policies may be enforced by one or more user control units that receives respective user signals for transmission, applies the system policies, and then combines the multiple user spectrum allotments onto a common optical transmission path for transmission to a receive station. In addition, the user control unit(s) may be configured to add or remove optical power from the transmitted signal in response to changes in the power of the user-allocated portions of the system bandwidth, e.g. if the customer's input signal is absent or degraded due to some failure.

As used herein a "user" refers to an entity to which a portion of the system bandwidth has been allocated for use. A user may be a customer of a system owner. The system owner may also be a user. The portion of the system bandwidth allocated to one user may be referred to herein a "user-allocated portion of the system bandwidth" or "user-allocated bandwidth." The term "terminal" when use herein without designation as a transmitting or receiving terminal refers to a terminal that may be used for transmitting and/or receiving signals. The term, "wavelength selective switch" refers to a device or set of devices that is configured to switch some amount of optical bandwidth from one output to one or more outputs. In a WDM system, a channel may be utilized or unutilized. As used herein, a "utilized channel" refers to a channel that contains an information carrying signal and an "unutilized channel" refers to a channel that does not contain an information carrying signal. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1A:
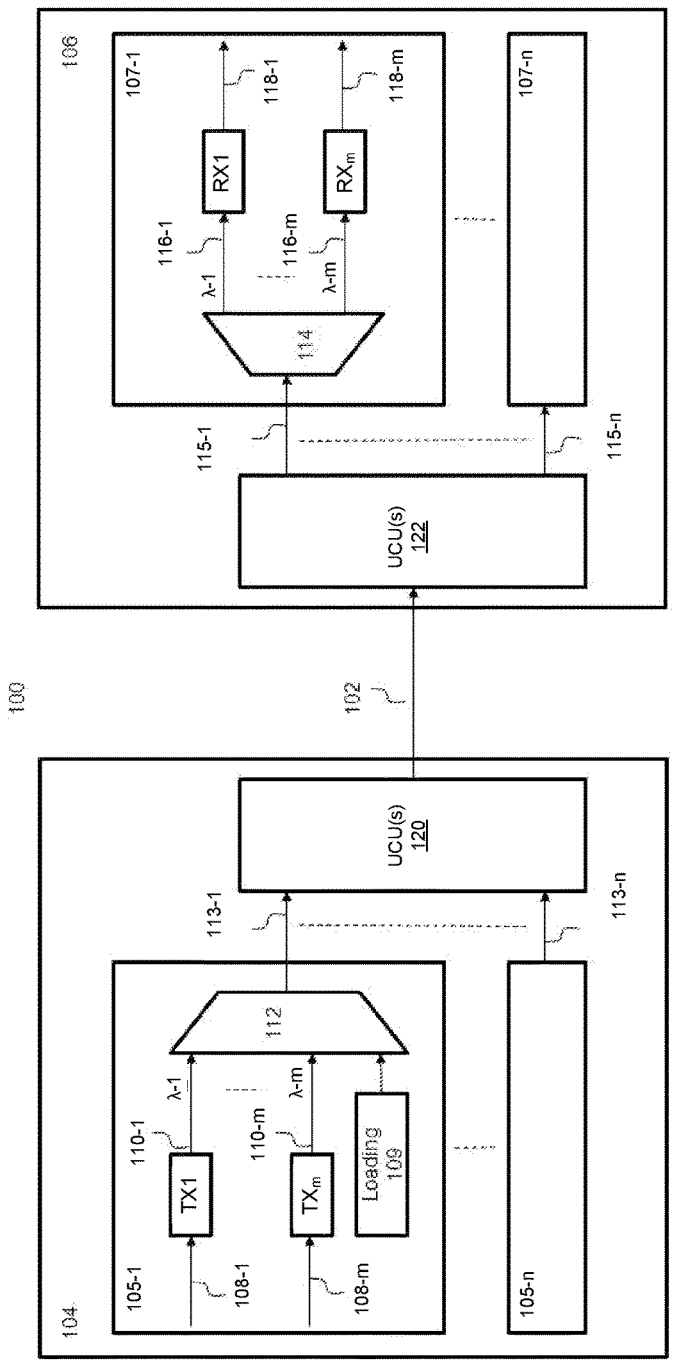
FIG. 1A is a simplified block diagram of one exemplary embodiment of a wavelength division multiplexed (WDM) communication system consistent with the present disclosure.
Figure 1B:
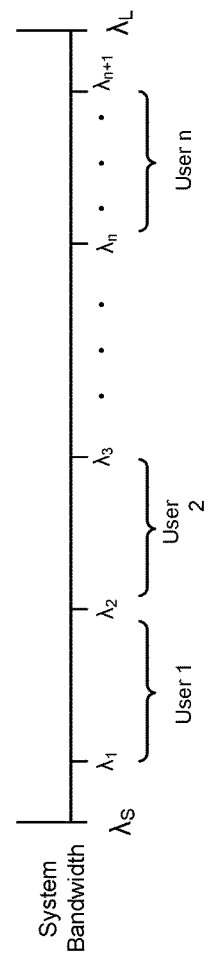
FIG. 1B diagrammatically illustrates the system bandwidth for the system illustrated in FIG. 1 showing allocation of portions of the system bandwidth to different users.

FIG. 1A is a simplified block diagram of one exemplary embodiment of a WDM communication system 100 consistent with the present disclosure. FIG. 1B diagrammatically illustrates the system bandwidth for the system illustrated in FIG. 1A showing the allocation of different portions of the system bandwidth to different users.

The communication system 100 serves to transmit a plurality of optical channels over an optical path 102 from a transmitting terminal 104 to one or more remotely located receiving terminals 106. The exemplary system 100 may be a long-haul submarine system configured for transmitting the channels from a transmitter to a receiver, for example, at a distance of 5,000 km, or more. Those of ordinary skill in the art will recognize that the communication system 100 has been depicted as a highly simplified point-to-point unidirectional system for ease of explanation. For example, the transmitting terminal 104 and receiving terminal 106 may both be configured as transceivers or transponders, whereby each may be configured to perform both transmitting and receiving functions. For ease of explanation, however, the terminals are depicted and described in FIG. 1 with respect to only a transmitting or receiving function. The transmitting and receiving terminals may include equipment that is not illustrated in FIG. 1A. The transmitting terminal 104, for example, may include additional optical fibers, waveguides, optical amplifiers, optical filters, dispersion compensating modules, and other active and passive optical components, referred to as the "Wavelength Terminating Equipment" (WTE), coupled to the optical path. The illustrated exemplary embodiments herein are thus provided only by way of explanation, not of limitation.

As illustrated in FIG. 1B, the overall system bandwidth may extend from a short wavelength $\lambda_S$ to a long wavelength $\lambda_L$. Different portions of this system bandwidth may be allocated to different users so that no user has a user-allocated bandwidth encompassing any portion of a different user's user-allocated bandwidth. In the illustrated embodiment, for example, optical bandwidth between $\lambda_1$ and $\lambda_2$ has been allocated to User 1, bandwidth between $\lambda_2$ and $\lambda_3$ has been allocated to User 2, and bandwidth between $\lambda_n$ and $\lambda_{n+1}$ has been allocated to User n. In a system consistent with the present disclosure, different portions of the system bandwidth may be allocated to any number n of users, and the users may have the same or a different amount of allocated bandwidth, e.g. in the form of one contiguous band or multiple non-contiguous bands.

Each user may establish optical channels within its user-allocated bandwidth. In the illustrated exemplary embodiment, the transmitting terminal 104 includes separate transmitting subsystems 105-1 . . . 105-n associated with each user. Each of the subsystems 105-1 . . . 105-n generates channels and loading power within the corresponding user-allocated bandwidth, and aggregates the channels and loading power into an associated band of occupied spectrum.

For ease of explanation, only the transmitting subsystem 105-1 associated with User 1 is shown in detail in FIG. 1A, it being understood that the other transmitting subsystems, e.g. 105-n, may be constructed with the same or a different configuration. In the illustrated configuration, the transmitting subsystem 105-1 includes a plurality of transmitters TX1 . . . TX$_m$ that receive data on respective data paths 108-1 . . . 108-m and transmit respective optical signals by modulating the data on respective optical carrier wavelengths $\lambda_1$ . . . $\lambda_m$ within the user-allocated bandwidth associated with User 1. Data may be modulated on the channel wavelengths $\lambda_1$ . . . $\lambda_m$ using various modulation formats and data rates. The transmitters TX1 . . . TX$_m$ are shown in highly simplified form for ease of explanation. Each transmitter TX1 . . . TX$_m$ may include electrical and optical components configured for transmitting the optical signal at its associated wavelength with a desired amplitude and modulation.

The transmitting subsystem 105-1 may also include loading equipment 109 for generating loading power to control the total power of the signals that will reach one or more User Control Units (UCUs) 120. A variety of configurations for the loading equipment 109 are known. The loading power provided by the loading equipment 109 may be blocks of amplified spontaneous emission (ASE) noise, channelized (sliced) ASE or continuous-wave tones. Additional optical power for loading may be needed within the user-allocated bandwidth to meet the policies related to limits on total power, power spectral density, and peak power.

The transmitted channel wavelengths $\lambda_1$ . . . $\lambda_m$ are respectively carried on a plurality of optical paths 110-1 . . . 110-m to a multiplexer 112 that combines the channel wavelengths $\lambda_1$ . . . $\lambda_m$ and any loading power from the loading equipment 109 to form a user-specific aggregate optical signal on an optical path 113-1. The transmitting subsystem, e.g. system 105-n, for one or more additional users may similarly produce a user-specific aggregate optical signal on optical paths, e.g. path 113-n, associated with other users. However, each user may control the specific configuration of its associated transmitting subsystem 105-1 . . . 105-n. The transmitting subsystems 105-1 . . . 105-n may therefore include different hardware configurations establishing different transmission characteristics for each user. Also, although the illustrated exemplary embodiment shows the transmitting subsystems 105-1 . . . 105-n being located in the transmitting terminal 104, one or more of the transmitting subsystems 105-1 . . . 105-n may be at a separate physical location from the transmitting terminal 104 and/or the UCU(s) 120.

As will be discussed in greater detail below, the UCU(s) 120 combines the user-specific aggregate signals from each user to produce a combined aggregate optical signal on the optical path 102 in a manner that enforces system policies. The combined aggregate optical signal that is launched onto the optical path 102 may be received at the remote receiving terminal 106. The remote receiving terminal 106 includes one or more UCUs 122 and separate receiving subsystems 107-1 . . . 107-n associated with each of the n users. In the illustrated embodiment, the UCU(s) 122 de-aggregates the combined aggregated optical signal received on the optical path 102 into the separate user-specific aggregate optical signals based on associated policy rules, e.g. security policy rules. The optical paths 115-1 . . . 115-n carry the respective user-specific aggregate optical signals to respective ones of the receiving subsystems 107-1 . . . 107-n.

For ease of explanation, only the receiving subsystem 107-1 associated with User 1 is shown in detail in FIG. 1A, it being understood that the other receiving subsystems, e.g. 107-n, may be constructed with the same or a different configuration. In the illustrated exemplary embodiment, the receiving subsystem 107-1 includes a splitter 114 that provides signals at channel wavelengths $\lambda_1 \ldots \lambda_m$ onto associated paths 116-1 . . . 116-m coupled to associated channel receivers $RX_1 \ldots RX_m$. The splitter 114 may take a known configuration and may, or may not, be wavelength specific. The receivers $RX_1 \ldots RX_m$ may be configured to demodulate the optical signals on the separated channels and provide associated output data signals on respective output data paths 118-1 . . . 118-m. The receivers $RX_1 \ldots RX_m$ may take a known configuration direct detection or coherent receiver configuration and are shown in highly simplified form for ease of explanation. Each receiver $RX_1 \ldots RX_m$ may include electrical and optical components configured for receiving and demodulating the optical signal at its associated wavelength $\lambda_1 \ldots \lambda_m$.

The receiving subsystems, e.g. 107-n, for one or more additional users may similarly produce output data signals. However, each user may control the specific configuration of its associated receiving subsystem 107-1 . . . 107-n. The receiving subsystems 107-1 . . . 107-n may therefore include different hardware configurations establishing different receiver characteristics for each user. Also, although the illustrated exemplary embodiment shows the receiving subsystems 107-1 . . . 107-n being located in the receiving terminal 106, one or more of the receiving subsystems 107-1 . . . 107-n may be at a separate physical location from the receiving terminal 106 and/or the UCU(s) 122.

One or more of the receiving subsystems 107-1 . . . 107-n may also be configured to report performance measurements such as the OSNR, the BER and/or Q-factor of one or more of the signals coupled to each of the receiving subsystems 107-1 . . . 107-n and may provide this information to the UCU(s) 120 and/or UCU(s) 122. The UCU(s) 120 and/or UCU(s) 122 may use the performance information to determine if a system policy has been violated, to determine if the system transmission characteristics remained static, or to remedy any system policy violation.

Figure 2:
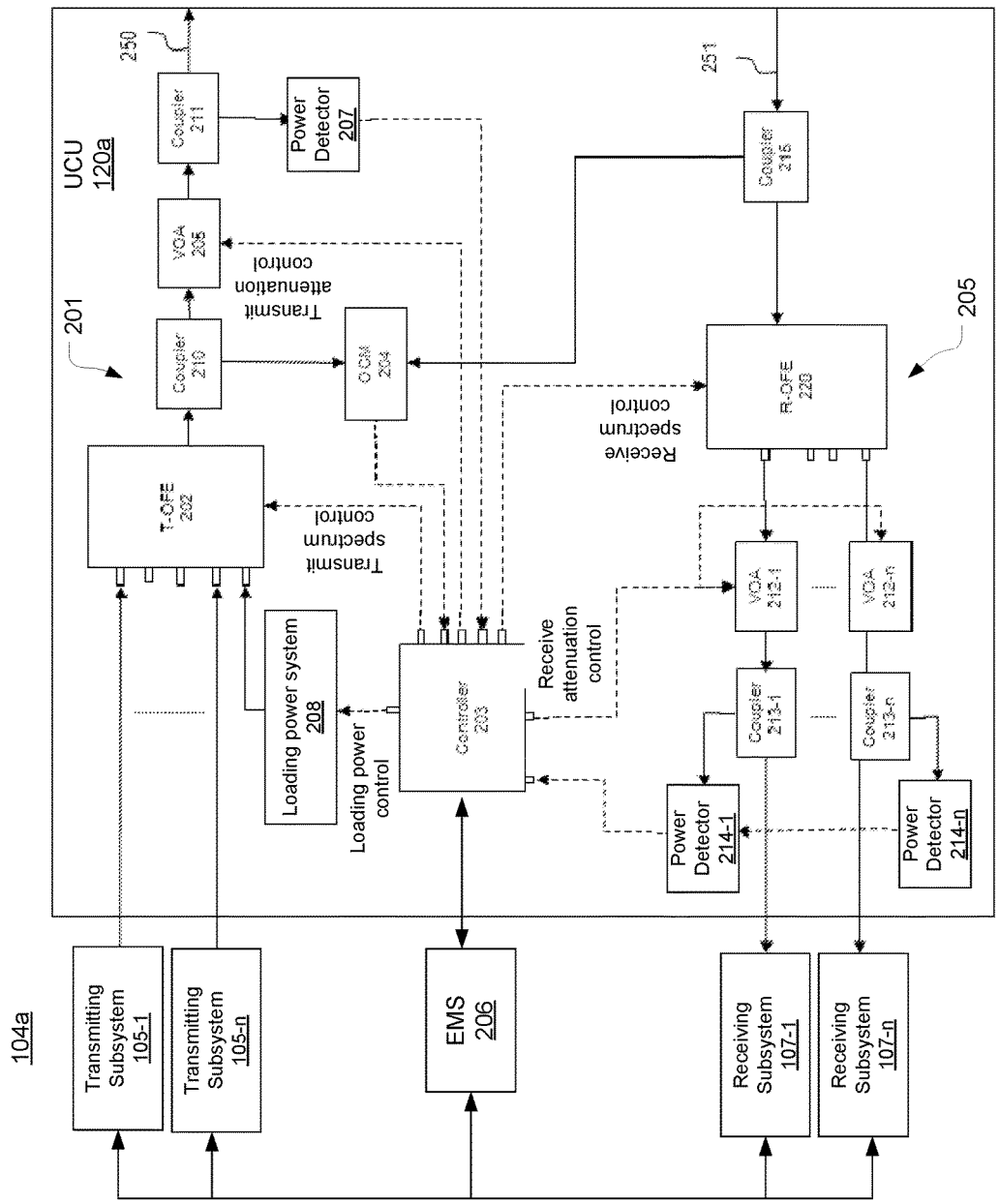
FIG. 2 is a simplified block diagram of one exemplary embodiment of a terminal consistent with the present disclosure.

Turning now to FIG. 2, there is illustrated an exemplary embodiment 104a of a terminal consistent with the present disclosure. The illustrated exemplary embodiment 104a is configured for bi-directional communication and includes a single UCU 120a for enforcing system policies in the user-allocated bandwidth of all users. The UCU 120a includes a transmit path 201, controller 203, a receive path 205, a loading power system 208, an Optical Channel Monitor (OCM) 204 and power detectors 207 and 214-1 . . . 214-n. The OCM 204 may take a known configuration. The power detectors 207 and 214-1 . . . 214-n may be any known device for detecting optical power, such as known broad band optical photo detectors.

The transmit path 201 of the UCU 120a includes a Transmit Optical Filter Element (T-OFE) 202, couplers 210 and 211 and a variable optical attenuator (VOA) 205. The receive path includes a Receiver Optical Filter Element (R-OFE) 220, couplers 215 and 213-1 . . . 213-n, and VOAs 212-1 . . . 212-n. The couplers 210, 211, 213-1 . . . 213-n, and 215 and the VOAs 205 and 212-1 . . . 212-n may take known configurations.

In general, n user-specific aggregate optical signals at the output of the transmitting subsystems 105-1 . . . 105-n are coupled as n inputs to the T-OFE 202, and the output of the loading power system 208 is coupled as another input to the T-OFE 202. The T-OFE 202 aggregates the outputs of the transmitting subsystems 105-1 . . . 105-n and the loading power system 208 and provides an aggregate signal. The aggregate signal is coupled through the VOA 205 and the couplers 210 and 211 to provide an aggregate common transmit signal on path 250 coupled to the optical path 102 (FIG. 1A). The coupler 210 couples a portion of the aggregate signal at the output of the T-OFE 202 to the OCM 204. The coupler 211 couples a portion of the aggregate signal at the output of the T-OFE 202 to the power detector 207.

The receive path 205 of the UCU 120a receives an aggregate common receive signal on path 251 from the optical path 102. The R-OFE 220 de-aggregates the aggregate signal provided on path 251 and provides associated de-aggregated signals. The de-aggregated signals are coupled to associated ones of the receiving subsystems 107-1 . . . 107-n through associated ones of the VOAs 212-1 . . . 212-n and couplers 213-1 . . . 213-n. The couplers 213-1 . . . 213-n each couple a portion of a de-aggregated signal at the output of the ROFE 220 to an associated one of the power detectors 214-1 . . . 214-n. The coupler 215 couples a portion of the aggregate common receive signal to the OCM 204.

The T-OFE 202 and the R-OFE 220 may be provided in a variety of configurations and may each include one or more optical filtering devices. The filtering devices of the T-OFE 202 and R-OFE 220 limit the optical signals at the outputs thereof to each user's user-allocated bandwidth. The wavelength filtering spectrum shape of the T-OFE 202 and the R-OFE 220 and the total power or power spectral density of the optical spectrum that is transported to/from the T-OFE 202 and the R-OFE 220 may be established by the T-OFE 202 or R-OFE 220 in response to transmit spectrum control and receive spectrum control outputs, respectively, from the controller 203.

The optical filtering devices of the T-OFE 202 and the R-OFE 220 may be implemented with fixed optical passbands, and/or may be implemented with a reconfigurable optical filtering device, using, for instance, one or more wavelength selective switch (WSS) devices or tunable thin film filters. The T-OFE 202 and R-OFE 220, when based on a WSS device, may each also include one or more attenuating devices for controlling the power level of individual portions of the spectrum in the their outputs, e.g. on an optical frequency-dependent basis using gain flattening across the user-allocated spectrum. While a WSS based approach is described herein in connection with several other embodiments, the functionally of the WSSs may be implemented in other ways known to those of ordinary skill in the art. For example array waveguide gratings and/or fiber Bragg gratings may be configured to perform the functions, and the attenuation functions could be implemented with any of the various types of attenuators.

The controller 203 provides control outputs to the T-OFE 202, R-OFE 220, the VOA 205 and/or the VOAs 212-1 . . . 212n in response outputs from the OCM 204, the power detector 207, power detectors 214-1 . . . 214-n, as indicated by dotted lines in FIG. 2 The output from the OCM 204 to the controller 203 may indicate the total and/or per-channel power and/or the channel configuration in the aggregate output of the T-OFE 202 and/or the aggregate input of the R-OFE 220. The output of the power detector 207 may indicate the amount of optical power in the aggregate output signal on path 251, and the output of the power detectors 214-1 . . . 214-n may each indicate the amount of optical power in an associated ones of the de-aggregated signals from the R-OFE 220.

In response to the outputs of the OCM 204 and the power detector 207 the controller may provide a transmit spectrum control output signal to the T-OFE 202 and/or a transmit attenuation control output to the VOA 205. The transmit spectrum control output and the transmit attenuation control output are configured to control the outputs of the T-OFE 202 and the VOA, respectively, for dynamically enforcing the policies set for the system. The transmit spectrum control output to the T-OFE 202 may, for example, cause dynamic adjustments of the wavelength filtering spectrum shape of the T-OFE 202 to prevent any user channel or wavelength outside of the respective user-allocated bandwidth for each user from being coupled to the aggregate output signal on path 250. The transmit spectrum control output to the T-OFE 202 may also, or alternatively, dynamically adjust the T-OFE 202 to change the power level in different portions of the aggregate output of the T-OFE 202 for controlling the power in different user-allocated bandwidths or portions thereof. The transmit attenuation output to the VOA may cause dynamic adjustment of an attenuation imparted by the VOA 205 to the aggregate output to cause adjustments of the total power in the aggregate common transmit signal provided on path 250 or in different user-allocated bandwidths or portions thereof.

Likewise, in response to the output of the OCM 204 and the power detectors 214-1 . . . 214-n the controller 203 may provide a receive spectrum control output to the R-OFE 220 and one or more receive attenuation control outputs to the VOAs 212-1 . . . 212-n. The receive spectrum control output and the receive attenuation control output are configured to control the outputs of the R-OFE 220 and VOAs 212-1 . . . 212-n, respectively, for dynamically enforcing the policies set for the system to provide de-aggregated signals to the receiving subsystems 107-1 . . . 107-n that are consistent with the system policies. The receive spectrum control output may, for example, cause dynamic adjustments of the wavelength filtering spectrum shape of the R-OFE 220 to prevent any user channel or wavelength outside of the respective user-allocated bandwidth for each user from being coupled to the output of the R-OFE. The receive spectrum control output to the R-OFE 220 may also, or alternatively, dynamically adjust the R-OFE 220 to change the power level in different ones of the de-aggregated outputs of the R-OFE 202. The receive attenuation outputs to the VOAs 212-1 . . . 212-n may cause dynamic adjustment of an attenuation imparted by each of the VOAs 212-1 . . . 212-n to cause adjustments of the total power in each of the de-aggregated signals, or portions thereof.

The controller 203 may also or alternatively provide a loading power control output to the loading power system 208 in response to the output of the OCM 204 and/or the power detector 207. In response to the loading power control output from the controller 203, the loading power system 208 may reconfigure the spectrum of the loading power provided from the loading power system 208 to the input of the T-OFE 202. The loading power system 208 may be provided in a variety of configurations. For example, the loading power system 208 may include a loading power source or sources, e.g. an ASE source and may include a reconfigurable optical filter, for example a WSS device. The reconfigurable loading power source may be configured to produce broadband noise bands in spectrum locations corresponding to locations of spectrum in the aggregate output of the T-OFE 202 that do not meet minimum power range policies set for the system.

The system policies may be established and programmed in the controller 203 by an Element Management System (EMS) 206 configured for bi-directional communication with the controller 203, the transmitting subsystems 105-1 . . . 105-n and the receiving subsystem 107-1 . . . 107-n. The EMS 206 may also be configured in a known manner to supervise and manage network elements within the system 100 (FIG. 1) and to communicate with a network management system (NMS). The NMS may be configured to manage the overall system by communicating with several EMSs. The EMS 206 may be one of several other EMSs (not shown) in the system 100 and may communicate with an associated NMS (not shown). These other EMSs could control the customer's equipment. In a system consistent with the present disclosure, the controller 203 may, for example, communicate with the EMS 206 when the controller 203 detects a violation of system policy rules, e.g. in response to an output of the OCM 204 and/or the power detectors 207 or 214-1 . . . 214-n. In response, the system may raise an alarm, e.g. at the EMS and NMS level indicating the violation while the controller 203 makes a dynamic correction of the violation.

Advantageously, a system consistent with the present disclosure may dynamically enforce system policies in a system including user-allocated optical bandwidth. The system may, for example, prevent any user channel or wavelength outside of the respective user-allocated bandwidth for each user from being coupled to the aggregate output signal or the de-aggregated signal. The system may also dynamically control the total output power in any portion, e.g. in each user-allocated bandwidth, of aggregate output signal or the de-aggregated signal.

In addition, a system consistent with the present disclosure may dynamically coordinate changes in loading power as wavelengths are added or removed either as a result of faults in the network or by users within their associated user-allocated bandwidth. This feature allows dynamic provisioning by the users. As illustrated, for example, in FIG. 2, the EMS 206 may be configured for communication with the transmitting subsystems 105-1 . . . 105n and the receiving subsystems 107-1 . . . 107-n. In one embodiment, the EMS 206 may store a number of known good configurations for each user's user-allocated bandwidth. The known good configurations may be derived, for example, from system performance simulations. A user may then send a request through its associated transmitting subsystem 105-1 . . . 105-n to the EMS 206 indicating that it wants additional capacity. The EMS 206 may then communicate with the user transmitting subsystem, e.g. 105-1, as to what wavelengths are available and the appropriate power setting. The EMS 206 may then coordinate with the transmitting subsystem, e.g. 105-1, to bring up the transmission signal and adjust the loading power, e.g. based on the known good configurations. The request for reducing capacity may be handled in a similar manner.

The EMS 206 may also or alternatively be configured to perform EMS functionality using feedback from the performance measurements, e.g., modulation characteristics, error correction performance, OSNR performance, data rates, etc., at the receiving subsystems 107-1 . . . 107-n. For example, if a user upgrades their transmitting subsystem, e.g. 105-1, to reduce channel spacing, the EMS 206 may be configured to determine the optimum wavelengths and channel powers for that new equipment, e.g. using feedback from the performance measurements at the associated receiving sub-system, e.g. 107-1, to ensure optimum performance or enforce a system policy setting a minimum performance. To facilitate this, the link may be established between the receiving subsystems 107-1 . . . 107-n and the EMS 206 may facilitate sharing of performance measurements made at the receiving subsystems 107-1 . . . 107-n.

A system consistent with the present disclosure may also or alternatively monitor transmission system characteristics and modify system policies to compensate for aging in a system. For example, as a system ages, the spectral (gain) shape of the link may change. It may then be useful to adjust the launched optical power policies to maintain acceptable performance. In this scenario, the EMS 206 may use feedback from customer provided transmission performance information to determine what power adjustments achieve an optimized or desired performance. Also, the EMS 206 may utilize other metrics based on receive spectrum measurements using an OCM. The system could then implement new policies by changing the transmit channel attenuation in the T-OFE 202 or by communicating the new policy launch values to the user transmission equipment.

Figure 3:
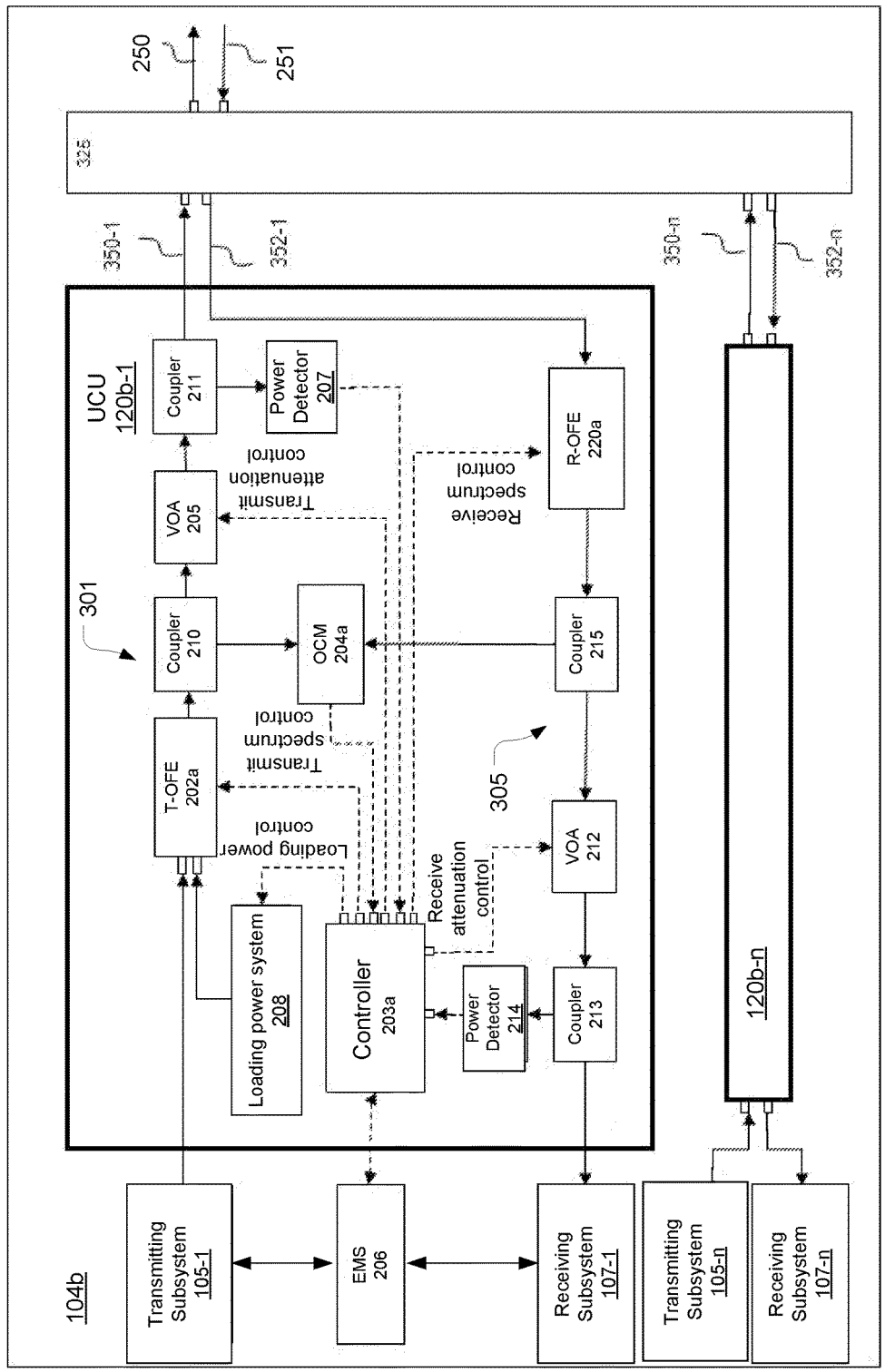
FIG. 3 is a simplified block diagram of another exemplary embodiment of a terminal consistent with the present disclosure.

A system including a UCU consistent with the present disclosure may be provided in a variety of configurations with different arrangements of elements. FIG. 3, for example, illustrates another embodiment 104b of a terminal consistent with the present disclosure. In the illustrated embodiment, each of the separate transmitting subsystems 105-1 . . . 105-n and receiving subsystems 107-1 . . . 107-n associated with the n users is associated with a different one of a plurality of UCUs 120b-1, . . . 120b-n configured to enforce policies set for the overall system and/or for an associated user. As shown, the user-specific aggregate transmit optical signal from each of the separate transmitting subsystems 105-1 . . . 105-n is coupled as input to an associated one of the user-specific UCUs 120b-1, . . . 120b-n, and likewise the user-specific output of each of the UCUs 120b-1, . . . 120b-n is coupled as input to a different user-specific receiving subsystem 107-1 . . . 107-n.

Each of the UCUs 120b-1 . . . 120b-n is coupled to an n-port combiner 325. An aggregate transmit signal 350-1 . . . 350-n from each of the UCUs 120b-1 . . . 120b-n is combined by the combiner 325, resulting in a common aggregate transmit signal 250 to be provided on the optical path 102 (FIG. 1). A common aggregate receive signal 251 is split by the combiner 325, and connected as inputs 352-1 . . . 352-n to the UCUs 120b-1 . . . 120b-n. The combiner 325 may take a known configuration and may, or may not, be wavelength-selective.

In the illustrated exemplary embodiment, for ease of explanation only the UCU 120b-1 associated with transmitting subsystem 105-1 and receiving subsystem 107-1 is shown in detail, it being understood that the other UCUs, e.g. UCU 120b-n, may be constructed with the same or a different configuration. The transmit path 301 of the UCU 120b-1 includes a T-OFE 202a, a VOA 205 and couplers 210 and 211. The receive path 305 of the UCU 120b-1 includes an R-OFE 220a, a VOA 212 and couplers 213 and 215. The UCU 120b-1 also includes power detectors 207 and 214, an OCM 204a, a loading power system 208 and a controller 203a that interfaces with an EMS 206. The transmitting subsystem 105-1 and the receiving subsystem 107-1 are also configured to interface with the EMS 206, e.g. to facilitate dynamic provisioning and/or system aging adjustments as described above.

The functions of elements in the UCU 120b-1 may be the same as the functions of the elements shown in the UCU 120a shown in FIG. 2. In the embodiment of FIG. 3, however, the T-OFE 202a aggregates only the output of the transmitting subsystem 105-1 associated therewith and the output of the loading power system, and R-OFE 220a in FIG. 3 provides a single output including the user-allocated bandwidth associated with receiving subsystem 107-1. Also, the OCM 204a may be configured for detecting the user-allocated bandwidth associated with the transmitting and receiving subsystems 105-1 and 107-1.

In general, the controller 203a in each UCU 120b-1 . . . 120b-n is configured to provide control outputs to the loading power system 208, the T-OFE 202a, VOA 205, R-OFE 220a and/or the VOA 212 to enforce policies set for the system and to restricts the associated user to its user-allocated bandwidth in response outputs from the OCM 204a, the power detector 207 and/or the power detector 214. The wavelengths (channels) and the channel power, and/or total power of the combined wavelengths passed to the aggregate output 350-1 of the UCU 120b-1 may be established by the T-OFE 202a in response to a transmit spectrum control output from the controller 203a. The channel power, and/or total power of the combined wavelengths passed to the aggregate output 350-1 may also, or alternatively, be established by the VOA 205 in response to a transmit attenuation control output from the controller 203a. Likewise, the wavelengths (channels) and the channel power, and/or total power of the combined wavelengths passed to the passed to the receiving subsystem 107-1 may be established by the R-OFE 220a in response to a receive spectrum control output from the controller 203a. The channel power, and/or total power of the combined wavelengths passed to the transmitting subsystem 107-1 may also, or alternatively, be established by the VOA 212 in response to a receive attenuation control output from the controller 203a.

Figure 4:
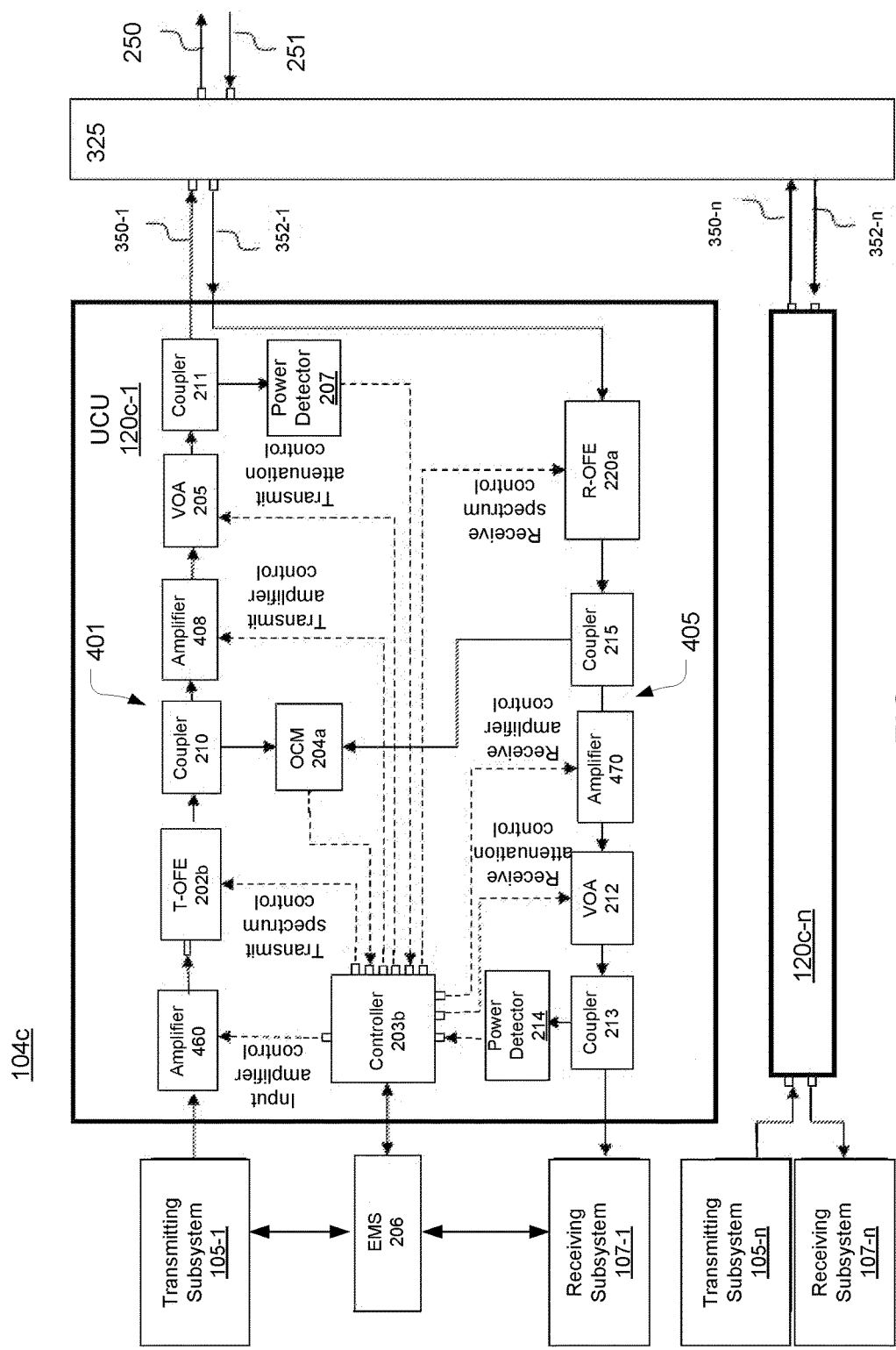
FIG. 4 is a simplified block diagram of another exemplary embodiment of a terminal consistent with the present disclosure.

FIG. 4 illustrates another embodiment 104c of a terminal consistent with the present disclosure. In the illustrated embodiment, each of the separate transmitting subsystems 105-1 . . . 105-n and receiving subsystems 107-1 . . . 107-n associated with the n users is associated with a different one of a plurality of UCUs 120c-1, . . . 120c-n configured to enforce policies set for the overall system and/or for an associated user. As shown, the user-specific aggregate transmit optical signal from each of the separate transmitting subsystems 105-1 . . . 105-n is coupled as input to an associated one of the user-specific UCUs 120c-1, . . . 120c-n, and likewise the user-specific output of each of the UCUs 120c-1, . . . 120c-n is coupled as input to a different user-specific receiving subsystem 107-1 . . . 107-n.

Each of the UCUs 120c-1 . . . 120c-n is coupled to an n-port combiner 325. An aggregate transmit signal 350-1 . . . 350-n from each of the UCUs 120c-1 . . . 120c-n is combined by the combiner 325, resulting in a common aggregate transmit signal 250 to be provided on the optical path 102 (FIG. 1). A common aggregate receive signal 251 is split by the combiner 325, and connected as inputs 352-1 . . . 352-n to the UCUs 120c-1 . . . 120c-n.

For ease of explanation only the UCU 120c-1 associated with transmitting subsystem 105-1 and receiving subsystem 107-1 is shown in detail, it being understood that the other UCUs, e.g. UCU 120c-n, may be constructed with the same or a different configuration. The transmit path 401 of the UCU 120c-1 includes a T-OFE 202b, a VOA 205, couplers 210 and 211 and amplifiers 460 and 408. The receive path 405 of the UCU 120c-1 includes an R-OFE 220a, a VOA 212, couplers 213 and 215 and an amplifier 470. The UCU 120c-1 also includes power detectors 207 and 214, an OCM 204a and a controller 203b that interfaces with an EMS 206. The transmitting subsystem 105-1 and the receiving subsystem 107-1 are also configured to interface with the EMS 206, e.g. to facilitate dynamic provisioning and/or system aging adjustments as described above.

The functions of elements in the UCU 120c-1 may be the same as the functions of the elements shown in the UCU 120a shown in FIG. 3. In the embodiment of FIG. 4, however, a loading system 208 is omitted and the T-OFE 202b does not aggregate separate inputs. Instead, the output of the transmitting subsystem 105-1 is coupled to the input of the T-OFE 202b through the amplifier 460. Noise loading capability is provided in the embodiment of FIG. 4 by operating the amplifier 460 to provide loading power.

In particular, in addition to providing transmit and receive spectrum control outputs to the T-OFE 202b and the R-OFE 220a, respectively, and transmit and receive attenuation control output outputs to the VOA 205 and VOA 212, respectively, as described above, the controller 203b is configured to provide an input amplifier control output to the amplifier 460, a transmit amplifier control output to the amplifier 408, and a receive attenuation control output to the amplifier 470 in response outputs from the OCM 204a, the power detector 207 and/or the power detector 214. The input amplifier control output to the amplifier 460 is configured to cause the amplifier to operate in constant output power or constant pump power mode so that the amplifier 460 generates sufficient ASE noise to meet system power policies, e.g. in the absence of one or more user signals in the user-allocated bandwidth associated with transmit subsystem 105-1. In addition or alternatively, the controller 203b may provide the input amplifier control output to the amplifier 460 and the transmit amplifier control output to the amplifier 408 so that the aggregate transmit signal 350-1 is consistent with system policies, e.g. it does not affect transmission performance of another user. The controller 203b may also or alternatively provide the receive amplifier control output to the amplifier 470 in the receive path 405 to maintain a specified signal amplitude provided to the receiving subsystem 107-1.

Figure 5:
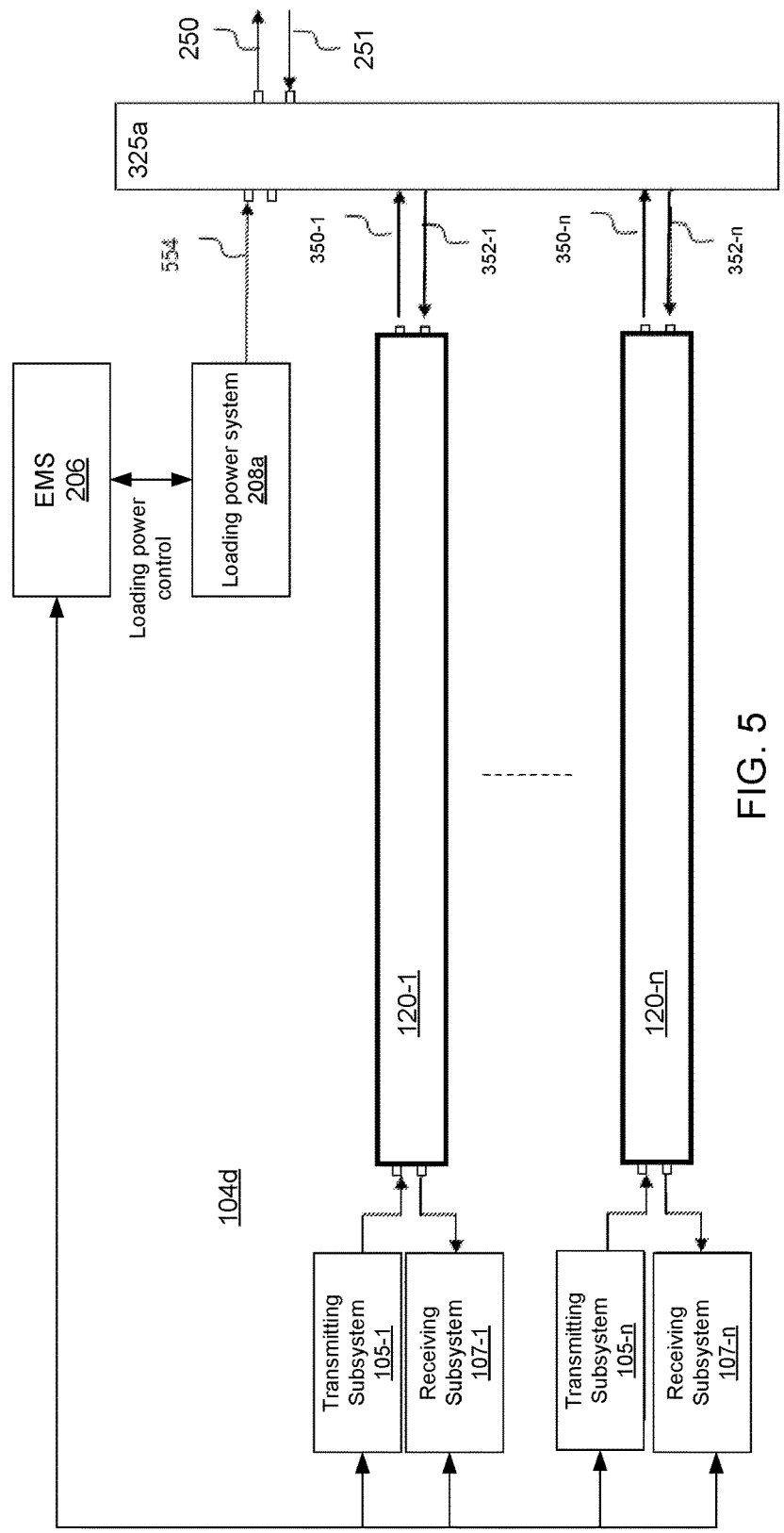
FIG. 5 is a simplified block diagram of another exemplary embodiment of a terminal consistent with the present disclosure.

FIG. 5 illustrates yet another embodiment of a transmission control system 104d consistent with the present disclosure. In the illustrated embodiment, each of the separate transmitting subsystems 105-1 . . . 105-n and receiving subsystems 107-1 . . . 107-n associated with the n users is associated with a different one of a plurality of UCUs 120-1, . . . 120-n configured to enforce policies set for the overall system and/or for an associated user. As shown, the user-specific aggregate transmit optical signal from each of the separate transmitting subsystems 105-1 . . . 105-n is coupled as input to an associated one of the user-specific UCUs 120-1, . . . 120-n, and likewise the user-specific output of each of the UCUs 120-1, . . . 120-n is coupled as input to a different user-specific receiving subsystem 107-1 . . . 107-n.

Each of the UCUs 120-1 . . . 120-n is coupled to a combiner 325a. Aggregate transmit signals 350-1 . . . 350-n from each of the UCUs 120-1 . . . 120-n and an output from a loading power system 208a are combined by the combiner 325a to provide an aggregate transmit signal 250 to be provided on the optical path 102 (FIG. 1). A common aggregate receive signal 251 is split by the combiner 325a, and connected as inputs 352-1 . . . 352-n to the UCUs 120-1 . . . 120-n.

The internal structure of the UCUs 120-1 . . . 120-n are not shown for simplicity. Each of the UCUs may be configured in a manner consistent with the present disclosure, e.g. as illustrated in FIG. 3 or FIG. 4, for enforcing system policies for each transmitting system 105-1 . . . 105-n and receiving subsystem 107-1 . . . 107-n associated therewith. Also, as described above, the transmitting subsystems 105-1 . . . 105-n and the receiving subsystems 107-1 . . . 107-n may be configured to interface with the EMS 206, e.g. to facilitate dynamic provisioning and/or system aging adjustments as described above.

The loading power system 208a may be configured to provide supplemental loading power, e.g. in response to a loading power control signal from the EMS 206 to supplement loading power provided by the users in the respective transmitting subsystems 105-1 . . . 105-n and/or by the UCUs. For example, if a user provides loading power using a loading power system 109 (FIG. 1) in its associated transmitting subsystem 105-1, the loading power may be compensated or adjusted using the loading power systems 208 (FIG. 2 or FIG. 3) and/or an amplifier 460 (FIG. 4). In response to a loading power control signal from the EMS 206, the loading power system 208a in FIG. 5 may provide any supplemental loading power required to meet system policies.

Figure 6:
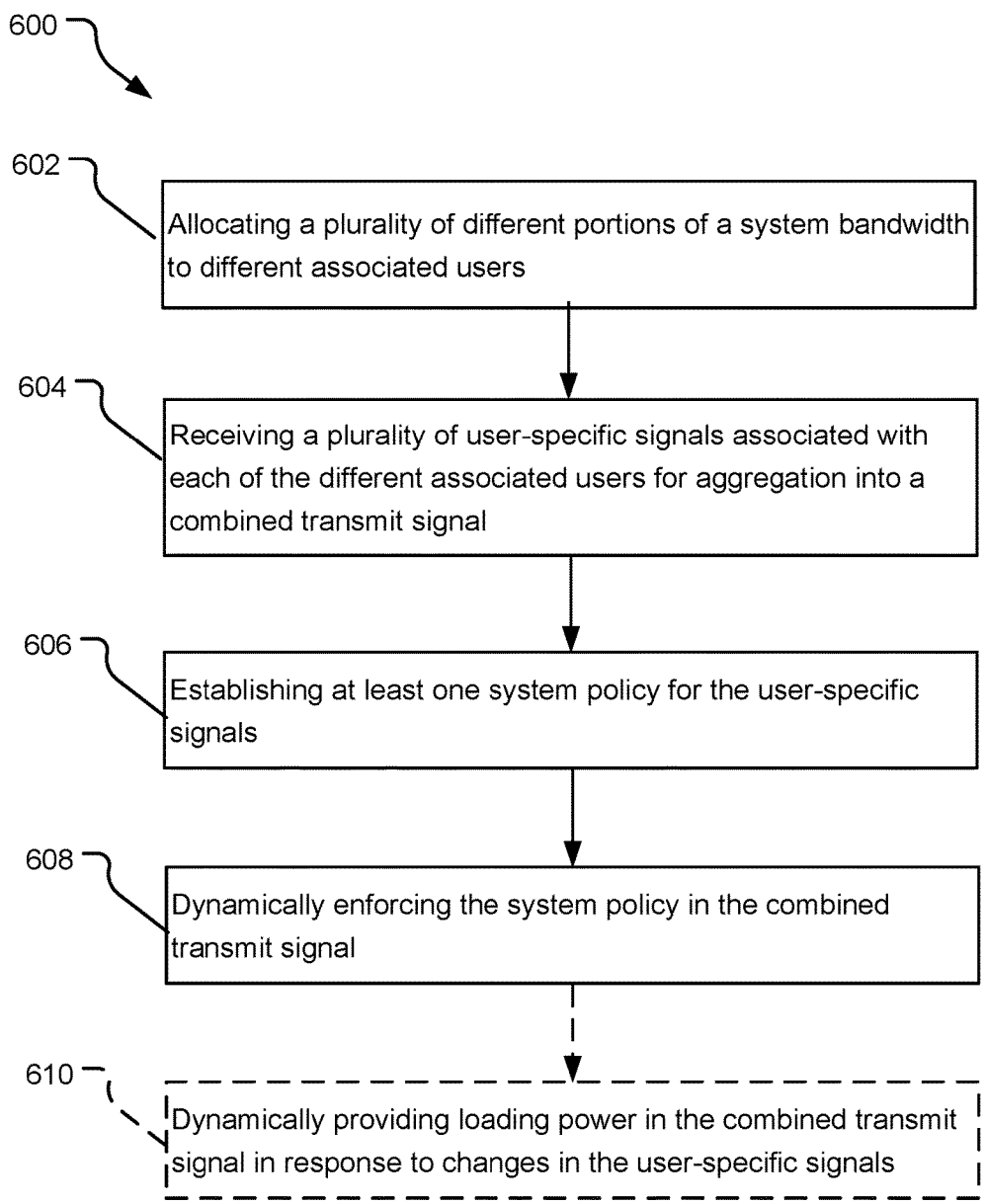
FIG. 6 is a flow chart illustrating one example of a method consistent with the present disclosure.

FIG. 6 is a flow chart illustrating a method 600 consistent with the present disclosure. Operation 602 includes allocating a plurality of different portions of a system bandwidth to different associated users. A plurality of user-specific signals associated with each of the different associated users received 604 for aggregation into a combined transmit signal. At least one system policy is established 606 for the user-specific signals, and the system policy is dynamically enforced 608 in the combined transmit signal. The system policy may, for example, restrict each of the user-specific signals to an associated one of the portions of the system bandwidth and/or restrict a power level associated with the user-specific signals. As shown in dotted lines in FIG. 6, the method 600 may optionally include dynamically providing loading power 610 in the combined transmit signal in response to changes in the user-specific signals. The changes may occur, for example, as a result of user-initiated changes in the channel allocation or loading within their user-allocated bandwidth, and/or a result of system failures While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure, there is thus provided a system including a plurality of transmitting subsystems, each of the plurality of transmitting subsystems being configured for transmitting an associated user-specific aggregate optical signal; at least one user control unit (UCU) coupled to at least one of the transmitting subsystems, the at least one UCU being configured to receive at least one of the user-specific aggregate optical signals from the at least one of the transmitting subsystems and provide at least one associated aggregate output signal including at least a portion of the at least one of the user-specific aggregate optical signals, the UCU being configured to dynamically adjust the at least one at least one associated aggregate output signal to enforce at least one predetermined system policy.

According to another aspect of the disclosure, there is provided a system including: a plurality of transmitting subsystems, each of the plurality of transmitting subsystems being configured for transmitting an associated user-specific aggregate optical signal in a different user-allocated bandwidth; at least one user control unit (UCU) coupled to at least one of the transmitting subsystems, the UCU including: a transmit optical filter element configured to receive at least one of the user-specific aggregate optical signals from the at least one of the transmitting subsystems and provide an associated aggregate output signal including at least a portion of the at least one of the user-specific aggregate optical signals, and a controller configured to provide a transmit spectrum control output to the transmit optical filter element for dynamically adjusting a filter spectrum of the transmit optical filter element to limit the associated aggregate output signal to the user-allocated bandwidth associated with the at least one of the user-specific aggregate optical signals.

According to another aspect of the disclosure, there is provided a method including: allocating a plurality of different portions of a system bandwidth to different associated users; receiving a plurality of user-specific signals associated with each of the different associated users for aggregation into a combined transmit signal; establishing at least one system policy for the user-specific signals; and dynamically enforcing the system policy in the combined transmit signal.

Embodiments of the methods described herein may be implemented using a processor, controller, server and/or other programmable device, such as a controller 203. To that end, the methods described herein may be implemented on a non-transitory tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry and/or optical components embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, controller or server, the functions may be provided by a single dedicated processor, by a single shared processor, or by a plurality of individual processors, some of which may be shared. Moreover, explicit use of the term "processor", "controller" or "server" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising: a plurality of transmitting subsystems, each of the plurality of transmitting subsystems being configured for transmitting an associated user-specific aggregate optical signal;
   at least one user control unit (UCU) coupled to at least one of the transmitting subsystems, the at least one UCU being configured to:
   receive at least one of the user-specific aggregate optical signals, corresponding to a user, from the at least one of the transmitting subsystems,
   aggregating a loading power signal and the received at least one of the user-specific aggregate optical signals to form at least one aggregate output signal, the loading power signal generated within UCU based on an output of an optical filtering element of the UCU,
   prevent a violation of at least one predetermined system policy by dynamically adjusting the at least one associated aggregate output signal to remain within a range of wavelengths included in a respective predetermined user-allocated bandwidth when the violation is at least one wavelength of the associated user-specific aggregate optical signal outside the respective predetermined user-allocated bandwidth allocated to the respective user, and
   provide, to an optical path, the at least one associated aggregate output signal comprising at least a portion of the at least one of the user-specific aggregate optical signals; and at least one element management system (EMS) configured to:
   communicate with the at least one UCU to establish the at least one predetermined system policy, communicate with the at least one of the transmitting subsystems to (i) receive a request from the user for change in transmission capacity and (ii) transmit information related to one or more available wavelengths and a power setting for each of the one or more available wavelengths, and coordinate a change in at least one system parameter in response to the request from the user for the change in the transmission capacity by adjusting at least a loading power for forming the user-specific aggregate optical signal corresponding to the user at the at least one of the transmitting subsystems based on the one or more available wavelengths, the respective power settings for the one or more available wavelengths, and one or more known configurations for the user.

2. The system according to claim 1, wherein the EMS is configured to store the one or more known configurations for the user.

3. The system according to claim 2, wherein the one or more known configurations are derived from at least a system performance simulation or feedback from performance measurements.

4. The system according to claim 1, wherein the at least one system parameter includes the loading power.

5. The system according to claim 1, wherein the at least one predetermined system policy comprises a pre-determined user-allocated bandwidth associated with the at least one transmitting subsystem, and wherein the UCU is configured to adjust the at least one associated aggregate output signal by limiting the at least one associated aggregate output signal to the pre-determined user-allocated bandwidth.

6. The system according to claim 1, wherein the at least one predetermined system policy comprises a pre-determined optical power associated with the at least one transmitting subsystem, and wherein the UCU is configured to adjust the at least one associated aggregate output signal by limiting the at least one associated aggregate output signal to the predetermined optical power.

7. The system according to claim 1, the system comprising a single one of the UCUs configured to receive each of the associated user-specific aggregate optical signals from each of the plurality of transmitting subsystems, the UCU being configured to provide a single one of the associated aggregate output signals comprising at least a portion of each of the user-specific aggregate optical signals and to adjust the single one of the associated aggregate output signals to enforce the at least one predetermined system policy.

8. The system according to claim 1, the system comprising a plurality of the UCUs, each of the plurality of UCUs being configured to receive an associated one of the user-specific aggregate optical signals from an associated one of the plurality of transmitting subsystems, each of the plurality of UCUs being configured to provide an associated aggregate output signal comprising at least a portion of the user-specific aggregate optical signal received thereby, each of the plurality of UCUs being configured to adjust the associated aggregate output signal to enforce the at least one predetermined system policy.

9. The system according to claim 8, the system further comprising a combiner for combining each of the associated aggregate output signals into a combined aggregate output signal.

10. The system according to claim 9, the system further comprising at least one loading power system for providing supplemental loading power, and wherein the combiner is configured for combining the supplemental loading power and the each of the associated aggregate output signals into the combined aggregate output signal.

11. The system according to claim 1, wherein the at least one UCU comprises at least one loading power system and a controller, the controller being configured to provide the loading power control signal.

12. The system according to claim 1, wherein the at least one UCU comprises an input amplifier and a controller, the controller being configured to provide the loading power control signal as an input amplifier control signal.

13. The system according to claim 1, the system further comprising: a plurality of receiving subsystems; the at least one UCU being configured to receive at least one user-specific aggregate receive signal and provide at least one user-specific de-aggregated optical signal comprising at least a portion of the user-specific aggregate receive signal to at least one of the receiving subsystems, the UCU being configured to adjust the at least one user-specific de-aggregated optical signal to enforce the at least one predetermined system policy.

14. A method comprising:
allocating a plurality of different portions of a system bandwidth to different associated users;
receiving, at a user control unit (UCU), a plurality of user-specific signals associated with each of the different associated users for aggregation into a combined transmit signal;
aggregating a loading power signal and the received the plurality of user-specific signals to form the combined transmit signal, the loading power signal generated within the UCU based on an output of an optical filtering element of the UCU,
establishing at least one system policy for the user-specific signals;
receiving, at an element management system (EMS), a request for a change in transmission capacity from at least one of the users;
transmitting, to the at least one of the users by the EMS, information related to one or more available wavelengths and a power setting for each of the one or more available wavelengths;
changing, at the EMS, at least one system parameter in response to the request for the change in transmission capacity by adjusting at least a loading power for forming a user-specific signal corresponding to the at least one of the users based on the one or more available wavelengths, the respective power settings for the one or more available wavelengths, and one or more known configurations for the at least one of the users, and
wherein a violation of the at least one system policy is prevented by dynamically adjusting at least one associated aggregate output signal to remain within a range of wavelengths included in a respective predetermined user-allocated bandwidth when the violation is at least one wavelength of an associated user-specific aggregate optical signal being outside the respective predetermined user-allocated bandwidth allocated to the respective user, and wherein the at least one combined transmit signal comprising the at least a portion of the at least one of the user specific aggregate optical signal and provided on an optical path.

15. The method according to claim 14, the method further comprising: storing the one or more known configurations for the at least one of the users.

16. The method according to claim 15, wherein the one or more known configurations are derived from at least a system performance simulation or feedback from performance measurements.

17. The method according to claim 14, wherein the at least one system parameter includes the loading power.

* * * * *